(No Model.)

A. F. CUSHMAN.
LATHE CHUCK.

No. 309,206. Patented Dec. 16, 1884.

(on y-y)

(on x-x)

Witnesses:
Jas. F. DuHamel
Walter S. Dodge

Inventor:
Austin F. Cushman,
by Dodgeson,
attys.

N. PETERS. Photo-Lithographer. Washington. D. C.

UNITED STATES PATENT OFFICE.

AUSTIN F. CUSHMAN, OF HARTFORD, CONNECTICUT.

LATHE-CHUCK.

SPECIFICATION forming part of Letters Patent No. 309,206, dated December 16, 1884.

Application filed August 20, 1884. (No model.)

*To all whom it may concern:*

Be it known that I, AUSTIN F. CUSHMAN, of Hartford, in the county of Hartford and State of Connecticut, have invented certain new and useful Improvements in Lathe-Chucks, of which the following is a specification.

My present invention relates to chucks for holding drills and other small articles; and the invention consists in certain novel features of construction, as hereinafter more fully set forth.

Figure 1:
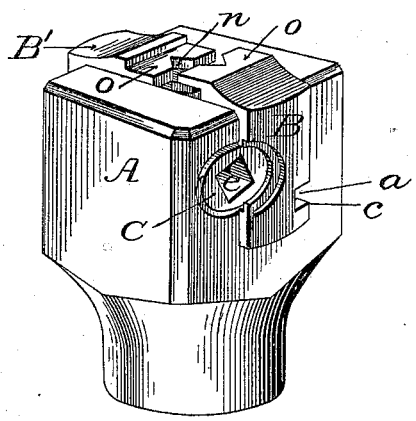
Figure 2:
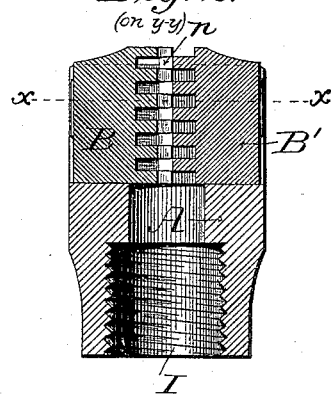
Figure 3:
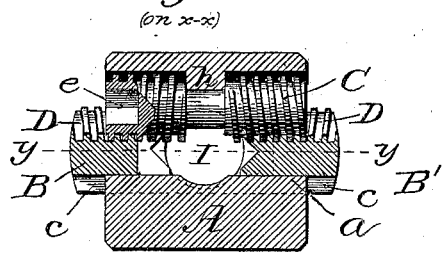

Figure 1 is a perspective view of the chuck complete ready for use. Fig. 2 is a longitudinal section on the line $y\ y$ of Fig. 3. Fig. 3 is a transverse section on the line $x\ x$ of Fig. 2 looking from the front, and Fig. 4 is a perspective view of one of the jaws detached.

The object of this invention is to construct a chuck that shall be simple and strong, and which shall be capable of grasping and firmly holding, as well as accurately centering, articles varying in diameter from the largest it will take down to the very smallest.

To construct a chuck on my plan I first form the body A of a single solid piece of metal of the form shown in Fig. 1, in which it will be seen that the main portion of the body proper is rectangular in cross-section, it merely having its corners chamfered or beveled, as shown. The object of thus forming the body is twofold: first, to enable a wrench to be conveniently applied to unscrew or detach it from the lathe-arbor; and, second, to afford as long a bearing as possible for the screw which operates the sliding jaws. A recess or slot is cut across the outer end of face of this body A of the proper depth to receive the two jaws B and B', there being a tongue or projection, $a$, formed across the inner wall on one side of this recess or slot to engage in a corresponding groove, $c$, cut in one side of the jaws, as shown in Figs. 1 and 3. In the wall of the slot on the opposite side I form a semicircular recess for the reception of the screw C, which moves the jaws, as shown in Figs. 1 and 3, there being left a semicircular projection, $h$, at the center of this recess to fit in a corresponding annular groove midway of the length of the screw, as shown in Fig. 3, this projection $h$ serving the twofold purpose of a box or bearing for the screw at the center, and also holding it from moving endwise. To fit in this recess I construct a screw, as shown in Fig. 3, it having an annular recess at its center, on one side of which it is provided with a right-hand thread, and on the opposite side with a left-hand thread, as shown. This screw-rod is made of a length just equal to the width of the body A, and has a rectangular recess or socket, $e$, formed in one of its ends for the reception of a correspondingly-shaped key for turning the screw when it is desired to move or adjust the jaws, as shown in Figs. 1 and 3. I also construct two jaws, B and B', of the proper thickness to fit in the slot or recess formed in the end of the body A, each of these jaws being provided with a series of what may be termed "teeth," $o$, as shown more clearly in Fig. 4, these teeth being separated by spaces of a width just equal to the thickness of the teeth, and the teeth on one jaw being arranged directly opposite the spaces of the other jaw, so that when the jaws are brought together the teeth $o$ of the two jaws will interlock, as shown in Fig. 2. All the teeth of both jaws have a V-shaped notch, $n$, cut in their projecting ends, as shown in Figs. 1, 2, 3, and 4, for the purpose of centering and grasping the drill or other article. It will readily be seen that as the jaws are brought together and their teeth $o$ are made to interlock or overlap the rectangular space formed by the notches $n$ in the two jaws will be reduced in size just in proportion as they are brought together until, when the teeth have moved far enough to carry the bottom of the notches $n$ in one jaw past the bottom of those of the other jaw, no space will be left between the faces of the opposing teeth, and in this way the teeth of the two jaws can be adjusted so as to grasp and hold the smallest object, even to or below the diameter of the smallest needle, and at the same time to hold it exactly at the center without the possibility of any side movement or displacement, it of course being understood that these notches shall be arranged so that their apexes will meet at the exact center of the body or chuck.

Figure 4:
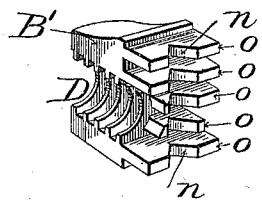

As shown in Figs. 1, 3, and 4, each jaw has formed in one of its sides a semicircular recess, D, in which screw-threads are cut to correspond with those on the screw-rod or shaft C, one having a right-hand and the other a left-hand thread, as shown in Fig. 3. A hole, I, is bored longitudinally through the center of the body A, as shown in Figs. 2 and 3, equal in diameter to the width of the slot in which the jaws are seated, or a little more, so that when it is desired to hold a rod or piece of wire it can project through said hole I, and from thence through the hollow arbor of the lathe to which the chuck may be secured. The rear end of the body A will be recessed and have a screw-thread cut therein, as shown in Fig. 2, for screwing it upon the end of the lathe-arbor; or, if preferred, as in some special cases it may be, the hole I may be extended all the way through of a uniform diameter, or nearly so, and have a shank or stem fitted therein, its projecting portion being made conical and of diameter to fit into a conical or tapering hole in the front end of the arbor.

The peculiar construction of the interlocking teeth o with their central V-shaped notches, n, enables them to grasp and hold a drill or any similar article in the most secure manner and at the same time to center it perfectly. At the same time they are far less apt to bend a small wire or similar article than are the teeth of chucks which are triangular in shape and which are arranged so that the inclined faces of the several teeth on the same jaw are made to alternate—that is, the inclined face of one running to one side, and the inclined face of the next running to the opposite side, as in such case each individual tooth bears against the article held on one side only—while in this case the faces of the notch n of each tooth bear equally on two sides of the drill or article held, and thereby prevent the tendency to spring or bend the article.

I am aware that chucks have been patented in which two jaws are moved by a right and left hand screw in a manner similar to mine, and also that a chuck has been patented in which the jaws have triangular teeth which are arranged to interlock or overlap, and also that chucks have been patented in which one jaw is provided with a V-shaped notch, while the other jaw has a V-shaped projection arranged to fit into the V-shaped notch, and therefore, I do not claim any of these; but, Having fully described my invention, what I claim is—

1. A chuck consisting of the body A and screw C, with the sliding jaws B B', said jaws being provided with the interlocking teeth o, each having a V-shaped notch formed in its front edge, substantially as shown and described.

2. The combination, in a chuck, of the two sliding jaws B B', each provided with a series of interlocking teeth, o, said teeth having V-shaped notches formed in the opposing edges, substantially as and for the purpose set forth.

3. A drill-chuck provided with sliding jaws for holding the drill, and having its body A made rectangular in cross-section, substantially as and for the purpose set forth.

AUSTIN F. CUSHMAN.

Witnesses:
TIMO. E. STEELE,
HARRISON B. FREEMAN.